Patented Feb. 14, 1928.

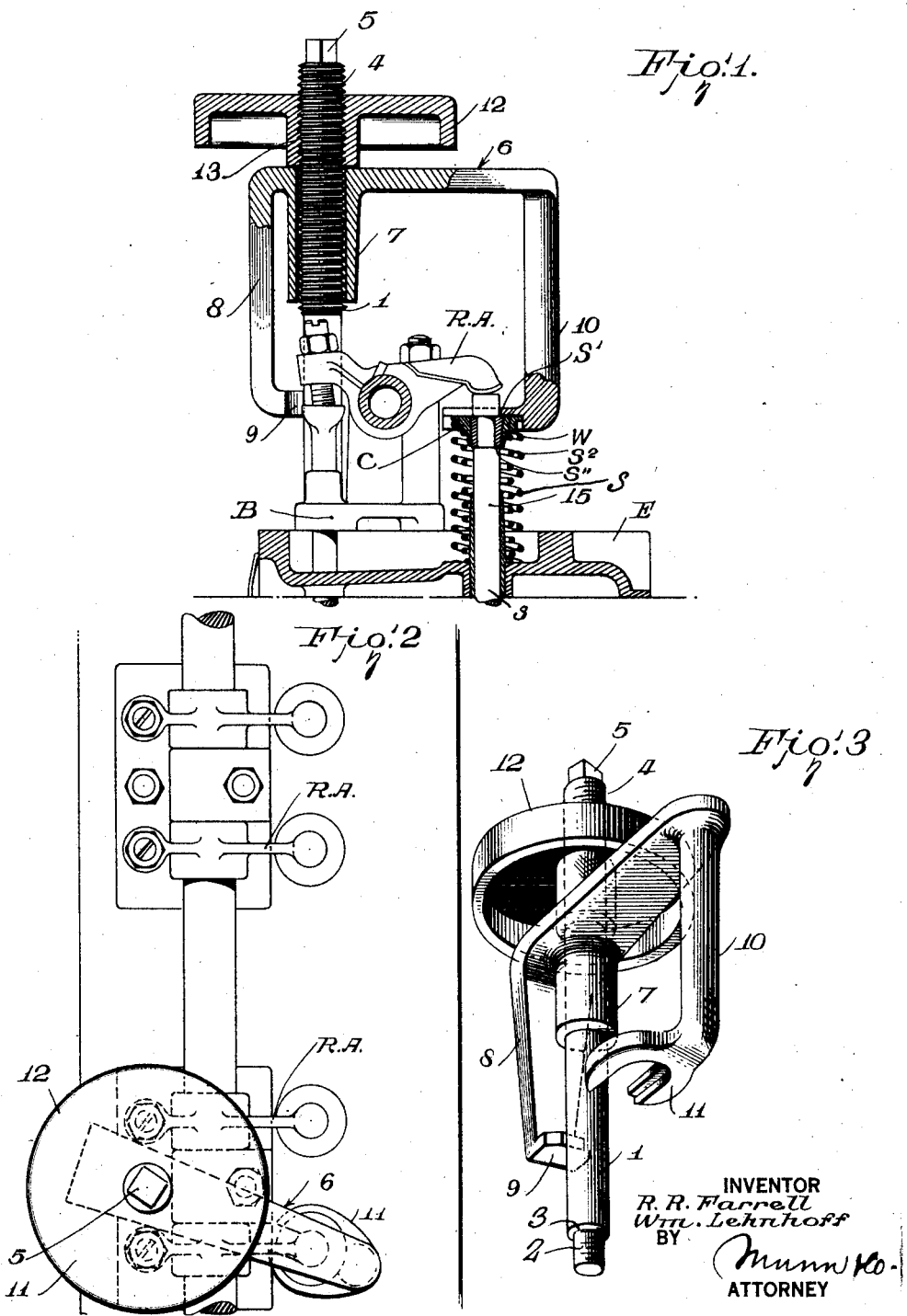

1,659,523

UNITED STATES PATENT OFFICE.

RICHARD R. FARRELL AND WILLIAM LEHNHOFF, OF SAN LUIS OBISPO, CALIFORNIA.

VALVE TOOL.

Application filed March 1, 1927. Serial No. 171,826.

This invention relates to tools for removing and replacing valve springs of automobiles and is more particularly adapted for use on Buick cars.

A primary object of the invention is to provide a tool of this character for removing and replacing broken valve springs on Buick master and standard models for 1924 and later, the tool being so constructed that the spring may be compressed and held thereby leaving both hands of the operator free for manipulating the valve locks and the springs so that absolute safety is assured.

Another object of the invention is to provide a device of this character by means of which a valve spring may be removed and another applied without interfering with the valve adjustment.

Other objects and advantages of the invention will become apparent from the following description considered in conjunction with the accompanying drawings, in which:—

Figure 1 represents a vertical section partly in elevation of this improved tool shown applied.

Figure 2 is a top plan view thereof, and

Figure 3 is a detail perspective view of the tool detached.

In the embodiment illustrated a portion of an engine head is shown at E having the usual valve spring S with a washer W arranged over it. A rocker arm RA is mounted on the engine head by a suitable bracket B, as is usual with this type of engine.

The tool constituting this invention comprises a shaft 1 which may be internally threaded or tapped ⅜ to receive a stud used in some models or to be used without stud for other models. The cap screw or nut on right side of the rocker arm assembly being first removed to provide for this engagement of the shaft. The upper end of the shaft 1 is threaded, as shown at 4, and has a reduced extension 5 angular in cross section and adapted to receive a wrench.

Slidably mounted on the shaft 1 is a valve compressor 6 made in the form of a beam having a depending collar 7 near one end which slidably engages the shaft 1, and from the adjacent end of which depends a brace 8 having an inturned toe 9 for slidably engaging the shaft and which is designed to hold the guide collar 7 against binding on the shaft when the compressor is screwed down against the tension of the valve spring S. At the other end of the beam is a depending arm 10 provided at its lower end with a laterally extending inturned foot 11, shown substantially U-shaped in form and which is designed to straddle the valve stem and rest on the top of the valve spring retaining washer W, as is shown clearly in Fig. 1.

A compressor wheel nut 12 is threaded on the upper end of shaft 1 and is equipped with a collar 13 which bears on the compressor beam when the wheel is screwed down on the shaft and forces the foot 11 of the compressor against the valve spring, thereby compressing the spring, the wheel nut holding the compressor in this position and thus leaving both hands of the operator free for manipulation of the valve lock and for the removal and application of the spring.

In the use of this tool, the cap screw or nut on the right side of rocker arm assembly of the cylinder that has the broken spring is removed, and the threaded reduced end 2 of the tool shaft 1 is engaged in the opening from which said screw has been taken. This shaft is screwed down tight against the cylinder head until the shoulder 3 thereof abuts the bracket B and when in this position the shaft will be securely held upright as shown in Fig. 1. The compressor in the form of a beam assembly 6 is then placed over the threaded vertical shaft 1, with the collar 7 thereof slidable on said shaft and with the foot 11 resting on top of the washer W, and with the toe 9 of the brace 8 resting against shaft 1 and operating to hold the collar against binding on the shaft. When this device is applied, the piston of the cylinder from which the valve spring is to be removed should be at the top center firing stroke. The compressor wheel nut 12 is then screwed down on shaft 1 with the collar 13 thereof bearing on the compressor forcing it down a sufficient distance to permit removal of the valve lock. The rocker arm RA is then moved out of the way to provide free acess for removal of the valve lock. This lock is here shown in the form of a two-piece sleeve S² of ordinary construction mounted on the valve stem s between shoulders S' and S" and having its outer face tapered downwardly to cooperate with the inner face of a collar c having its inner face flared to form a wedge-like locking engagement with sleeve S². This collar c carries the washer W. When the valve lock has been removed, the wheel nut 12 is also removed together with the beam assembly 6. The broken spring S may then be taken off the valve stem and replaced with a new one. After this replacing of the spring, the beam assembly 6 is again placed in position on the shaft 1 and compressed by means of the wheel nut 12, said compression being sufficient for the replacing of the valve lock. The rocker arm is then moved back into position, the wheel nut 12, beam assembly 6, and threaded shaft 1 removed from the cylinder head, and the cap screw again inserted in the rocker arm bracket. This completes the whole operation of removing and applying a valve spring without interfering in any way with the valve adjustment.

We claim:—

1. A valve spring tool comprising a shaft having means for mounting on an engine, a spring compressor slidable on said shaft, and a wheel nut threaded on said shaft above said compressor and operable to force said compressor down into engagement with a valve spring and to hold it in adjusted position.

2. A valve spring tool comprising a shaft, having means for mounting on an engine, a spring compressor slidable on said shaft and equipped with means to prevent binding of the compressor on the shaft, and means for forcing said compressor into engagement with a valve spring to hold it in adjusted position.

3. A valve spring tool comprising a shaft having means for mounting on an engine, a spring compressor slidable on said shaft, a sliding brace carried by the compressor and operable on the shaft to prevent binding of the compressor on the shaft, and means for forcing said compressor into engagement with a valve spring and for holding it in adjusted position.

4. A valve spring tool comprising a shaft having means for mounting on an engine, a spring compressor having a guide slidable on said shaft and a sliding brace for engaging the shaft to prevent binding of the guide on the shaft, a foot carried by the compressor to rest on the top of a valve spring retaining washer, and means for forcing said compressor into engagement with a valve spring and for holding it in adjusted position.

5. A valve spring tool comprising a shaft having means for mounting on an engine, a spring compressor having a guide slidable on said shaft and a sliding brace for engaging the shaft to prevent binding of the guide on the shaft, a foot carried by the compressor to rest on the top of a valve spring retaining washer, and a wheel nut threaded on said shaft above said compressor and adapted to engage the compressor and force it into engagement with a valve spring whereby the spring is compressed and held.

6. A valve spring tool comprising a shaft having a threaded end to be screwed rigid to a cylinder head, a beam like compressor having a guide collar slidable on said shaft and provided with a depending brace having an inturned toe slidably engaging the shaft to hold the collar against binding on the shaft, a valve spring engaging foot carried by said beam and means for forcing said foot into engagement with a valve spring and for holding it in adjusted position.

RICHARD R. FARRELL.
WILLIAM LEHNHOFF.